US010895417B2

(12) United States Patent
Kong et al.

(10) Patent No.: US 10,895,417 B2
(45) Date of Patent: Jan. 19, 2021

(54) METHOD FOR THE PRODUCTION OF AIR GASES BY THE CRYOGENIC SEPARATION OF AIR WITH IMPROVED FRONT END PURIFICATION AND AIR COMPRESSION

(71) Applicant: L'Air Liquide, Societe Anonyme pour l'Etude et l'Exploitation des Procedes Georges Claude, Paris (FR)

(72) Inventors: Paul Kong, Sugar Land, TX (US); Minh Pham-Huy, Houston, TX (US); Wendy Yip, Sugar Land, TX (US)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 462 days.

(21) Appl. No.: 15/468,926

(22) Filed: Mar. 24, 2017

(65) Prior Publication Data

US 2017/0276428 A1 Sep. 28, 2017

Related U.S. Application Data

(60) Provisional application No. 62/313,259, filed on Mar. 25, 2016.

(51) Int. Cl.
*F25J 3/04* (2006.01)
(52) U.S. Cl.
CPC ....... *F25J 3/04181* (2013.01); *F25J 3/04775* (2013.01); *F25J 2205/68* (2013.01);
(Continued)
(58) Field of Classification Search
CPC .. F25J 3/04181; F25J 3/04775; F25J 2205/68; F25J 2205/72; F25J 2210/40;
(Continued)

(56) References Cited

U.S. PATENT DOCUMENTS 3,738,084 A 6/1973 Simonet et al.
4,233,038 A 11/1980 Tao
(Continued)

FOREIGN PATENT DOCUMENTS

FR 2 849 172 6/2004
WO WO 2007 033 838 3/2007

OTHER PUBLICATIONS

Anonymous, "Method of Repressurising the Pretreatment PSA of a Cryogenic Air Separation Unit," originally published in Research Disclosure, Jun. 1999, p. 640, publ. No. 42160; ip.com Prior Art Database Technical Disclosure, ip.com No. IPCOM000019388D, ip.com Electronic Publication Date: Sep. 12, 2003.

*Primary Examiner* — Gordon A Jones
(74) *Attorney, Agent, or Firm* — Justin K. Murray

(57) ABSTRACT

A method and apparatus for the production of air gases by the cryogenic separation of air with front end purification and air compression can include using an available compressed dry gas such as nitrogen, oxygen, stored purified air, or synthetic air to repressurize the adsorber without diverting any of the purified air just exiting the currently on-line adsorber or changing the flow rate of the main air compressor or air sent to the cold box. This enables the main air compressor (MAC) to operate at a relatively constant flow rate while also sending a relatively constant air flow to the cold box during this repressurization step, thereby reducing the risks of process upsets and minimizing capital expenditures related to the MAC and other warm-end equipments.

17 Claims, 10 Drawing Sheets

(52) U.S. Cl.
CPC ........ *F25J 2205/72* (2013.01); *F25J 2210/40* (2013.01); *F25J 2210/42* (2013.01); *F25J 2215/02* (2013.01); *F25J 2245/40* (2013.01); *F25J 2245/42* (2013.01); *F25J 2245/50* (2013.01); *F25J 2290/62* (2013.01)

(58) Field of Classification Search
CPC .. F25J 2210/42; F25J 2245/40; F25J 2245/42; F25J 2245/50; F25J 2290/62; F25J 2215/02
See application file for complete search history.

(56) References Cited

U.S. PATENT DOCUMENTS

| | | | | |
|---|---|---|---|---|
| 5,116,396 | A * | 5/1992 | Prasad | B01D 53/226 |
| | | | | 62/655 |
| 5,137,548 | A * | 8/1992 | Grenier | B01D 53/04 |
| | | | | 95/115 |
| 5,531,808 | A | 7/1996 | Ojo et al. | |
| 5,587,003 | A | 12/1996 | Bulow et al. | |
| 5,906,674 | A * | 5/1999 | Tan | B01D 53/04 |
| | | | | 95/101 |
| 6,073,463 | A * | 6/2000 | Espie | F25J 3/04181 |
| | | | | 62/644 |
| 6,599,347 | B2 * | 7/2003 | Kalbassi | B01D 53/0462 |
| | | | | 62/643 |
| 6,607,582 | B2 * | 8/2003 | Massimo | B01D 53/047 |
| | | | | 62/648 |
| 6,821,316 | B2 * | 11/2004 | Guillard | B01D 53/047 |
| | | | | 95/117 |
| 7,846,237 | B2 * | 12/2010 | Wright | B01D 53/0462 |
| | | | | 95/11 |
| 9,795,915 | B2 * | 10/2017 | Kalbassi | B01D 53/0438 |
| 10,035,099 | B2 * | 7/2018 | Yoshikawa | B01D 53/346 |
| 2004/0221612 | A1 * | 11/2004 | Jaouani | F25J 3/040454 |
| | | | | 62/656 |
| 2010/0024640 | A1 * | 2/2010 | Blouin | B01D 53/047 |
| | | | | 95/21 |
| 2013/0319228 | A1 * | 12/2013 | Golden | B01D 53/0462 |
| | | | | 95/26 |
| 2014/0013798 | A1 * | 1/2014 | Le Bot | F25J 3/04054 |
| | | | | 62/643 |
| 2017/0087505 | A1 * | 3/2017 | Hashi | B01D 53/0462 |

* cited by examiner

ADSORPTION Vessel A
REGENERATION Vessel B

METHOD FOR THE PRODUCTION OF AIR GASES BY THE CRYOGENIC SEPARATION OF AIR WITH IMPROVED FRONT END PURIFICATION AND AIR COMPRESSION

TECHNICAL FIELD OF THE INVENTION

The present invention generally relates to a method for producing air gases by the cryogenic separation of air, and more particularly a method for improving the front end purification and air compression associated with said cryogenic separation.

BACKGROUND OF THE INVENTION

Air separation plants separate atmospheric air into its primary constituents: nitrogen and oxygen, and occasionally argon, xenon and krypton. These gases are sometimes referred to as air gases.

A typical cryogenic air separation process can include the following steps: (1) filtering the air in order to remove particulates that might damage the main air compressor (MAC); (2) compressing the pre-filtered air in the main air compressor and using interstage cooling to condense some of the water out of the compressed air; (3) passing the compressed air stream through a front-end-purification unit to remove residual water and carbon dioxide; (4) cooling the purified air in a heat exchanger by indirect heat exchange against process streams from the cryogenic distillation column; (5) expanding at least a portion of the cold air to provide refrigeration for the system; (6) introducing the cold air into the distillation column for rectification therein; (7) collecting nitrogen from the top of the column (typically as a gas) and collecting oxygen from the bottom of the column as a liquid.

With respect to step (3), the impurities are removed upstream the heat exchanger because, in the absence of such a pretreatment of the air, these impurities, particularly $CO_2$ and/or water vapor, would inevitably condense and solidify as ice while the air is being cooled to a cryogenic temperature, something which would cause problems of blocking in the cryogenic separation equipment or unit, especially the heat exchangers, distillation columns, etc., and thereby lead to malfunctioning of or damage to the equipment or unit.

To avoid these problems, it is common practice to pretreat the air that has to be cryogenically separated before this cryogenic separation. This pretreatment of the air is usually called "front end" scrubbing or purification, since it is carried out upstream of the cryogenic separation unit. Currently, the air is pretreated by a TSA (Temperature Swing Adsorption) process or by a PSA (Pressure Swing Adsorption) process depending on the case.

Conventionally, a TSA process cycle comprises the following steps:

a) purification of the air by adsorption of the impurities at superatmospheric pressure;

b) depressurization of the adsorber down to atmospheric pressure;

c) regeneration of the adsorbent at atmospheric pressure via introduction of a hot gas, for example the residual gases or waste gases, typically impure nitrogen coming from an air separation unit (ASU) cold box and heated by means of one or more regeneration heaters;

d) cooling of the adsorbent, especially by continuing to introduce into it the same residual gas stream coming from ASU cold box, but not heated;

e) repressurization of the adsorber using the purified air, coming, for example, from another adsorber which is in production phase.

Moreover, as regards a PSA process cycle, this includes substantially the same steps a), b) and e), but is distinguished from a TSA process by the residual gas or gases not being heated during the regeneration step (step c)), and therefore by the absence of step d) and, in general, a shorter cycle time than in a TSA process.

In modern designs, the front-end purification units operate based on adsorption and desorption of the impurities with varying pressures (pressure swing adsorption—"PSA") or temperature (temperature swing adsorption—"TSA"). In either case, there are typically at least two separate vessels configured in parallel and operating in a permutable fashion. This means that as one bed is online and adsorbing impurities until it reaches its capacity, the other bed is being regenerated (i.e., undergoing cleaning to remove the impurities). Once the first bed reaches its capacity for impurities, the configuration is switched, thereby causing the second bed to come online and start its adsorption phase, while the first bed (which was originally in adsorption phase) begins its regeneration phase. Such TSA or PSA air purification processes are described, for instance, in documents U.S. Pat. Nos. 3,738,084; 5,531,808; 5,587,003; and 4,233,038; all of which are herein incorporated by reference in their entireties.

Regeneration typically includes (1) depressurizing to near atmospheric pressure in order to remove the trapped gases and vent them to the atmosphere; (2) cleaning of the adsorbent bed by introduction of a dry, clean gas (often times waste nitrogen gas produced by ASU cold box) initially at an elevated temperature and then at an ambient temperature; and (3) repressurizing to feed pressure using clean product gas (i.e., purified air) from the other online bed.

FIGS. 1 and 2 represent processes known heretofore. FIG. 1 represents a flow diagram of front end purification unit 10, in which first adsorber A is in its adsorption cycle and second adsorber B is in the cleaning stage of its regeneration cycle. In this setup, valves 3A, 4A, 5B and 6B are open, while valves 3B, 4B, 5A, 6A, and 7 are closed.

In the example shown, 100 moles of compressed wet air 2 enters front end purification unit 10 after being compressed in the main air compressor (MAC) 1. Compressed wet air 2 passes through open valve 3A and into first adsorber A, wherein substantially all of the water vapor and carbon dioxide are captured thereby forming 100 moles of purified dry air 12. Purified dry air 12 then passes through valve 4A, leaving front end purification unit 10 and then on to the cold box 20 for rectification into an oxygen-enriched stream and a nitrogen-enriched stream.

Regeneration gas 14, which is preferably taken as a slip stream of the nitrogen-enriched stream, is introduced into front end purification unit 10 and passes through open valve 5B before entering second adsorber B, wherein regeneration gas 14 removes the remaining water and carbon dioxide to form wet waste gas 16, which is withdrawn and passes through open valve 6B before being vented to the atmosphere. Optionally, regeneration gas 14 can be heated by a heater (regeneration heater) prior to entering adsorber B in order to improve the regeneration of the adsorber vessel. If heating is used, then the adsorber is typically cooled down using the same regeneration gas 14, just without the optional heating.

FIG. 2 represents a flow diagram of front end purification unit 10 in which first adsorber A is still in an adsorption cycle and second adsorber B is in a pressurization phase (i.e., pressurizing back to normal adsorption pressure to be ready for its adsorption phase). In order to accomplish this, valves 5B and 6B are switched from open to closed, which halts the flow of regeneration gas 14 to second adsorber B. Valve 7 is opened, thereby allowing a small portion of the purified air flow to divert to second adsorber B. In the example shown, the MAC 1 has increased its output to 105 moles (from 100 moles) in order to accommodate the 5 moles of air being used to pressurize second adsorber B.

Once second adsorber B is at the desired pressure (e.g., same pressure as adsorber A), valves 3B and 4B would be switched to open, and then valves 3A and 4A, and 7 would be switched to the closed position. Once valve 7 is closed, the MAC 1 output decreases back to 100 moles in order to maintain a constant flow of air to the cold box 20. Valves 5B and 6B would remain closed. This switches the setup such that second adsorber B would be in its adsorption cycle while first adsorber A would be depressurized down to atmospheric pressure via a depressurizing valve (not shown) and subsequently regenerated by switching valves 5A and 6A to open.

During the pressurization phase, typically between 4 to 5%, of the processed air from the adsorber in production is used to re-pressurize the other adsorber prior to being put online. This is known as switch losses. The losses are experienced either by less air flow going to the cold box (while keeping MAC flow constant) or by ramping the MAC flow rate in order to keep a constant flow rate to the cold box and thus minimize cold box disturbances. However, both of these setups have major drawbacks.

If the MAC flow rate is kept constant, then periods of repressurization result in a change in air flow to the cold box, which leads to a disturbance resulting in a process upset, which can make controlling the overall process more difficult, as well as momentarily reducing product outputs. In instances in which flow to the cold box is kept constant (as shown in FIG. 2), ramping the flow rate of the MAC requires a MAC that is oversized for the majority of its operation. As such, a larger than necessary MAC, as well as warm-end equipments, such as air pre-cooling system and front end purification unit 10 are typically purchased, which leads to higher capital expenditures.

U.S. Pub. 2014/0013798 attempts to solve this problem by using variable air flows through turbine 27 (typically called a lost air turbine) to allow for a constant air flow to the distillation column. During repressurization cycles, the flow of air to the distillation column is kept constant; however, the air flow sent to the turbine is reduced, which means that the air flow sent to the cold box is also reduced during the repressurization cycle. This also results in differing conditions within the heat exchanger located in the cold box.

U.S. Pat. No. 6,073,463 adjusts rich liquid and waste flows to maintain product purities during repressurization since the air flow sent to the cold box is not kept constant.

Similarly, WO 2007/033838 adjusts the product flow from the cold box to compensate for the loss of air sent to the cold box during pressurization. A product gas buffer is added in the product stream in order to provide constant product flow to the customer. However, each of the above mentioned solutions suffer additional problems.

Therefore, there is a need for a process in which the MAC can operate at a substantially constant capacity (i.e., the MAC capacity is not purposefully adjusted during the repressurization step) while also maintaining a substantially constant flow of air to the cold box (i.e., the flow rate of air to the cold box is not purposefully adjusted during the repressurization step) such that process conditions within the cold box (e.g., flows in and out, temperatures, etc . . . ), and not just the distillation column, remain unchanged.

Therefore, it would be desirable to have an improved apparatus and method that avoids these added expenses and operates in an overall more efficient manner.

SUMMARY OF THE INVENTION

The present invention is directed to a method and apparatus that satisfies at least one of these needs. In one embodiment, the method can include using an available compressed dry gas such as nitrogen, oxygen, stored purified air, or synthetic air to repressurize the adsorber without diverting any of the purified air just exiting the currently on-line adsorber or changing the flow rate of the main air compressor or air sent to the cold box. This enables the main air compressor (MAC) to operate at a relatively constant flow rate while also sending a relatively constant air flow to the cold box during this repressurization step, thereby reducing the risks of process upsets and minimizing capital expenditures related to the MAC and other warm-end equipments. In one embodiment, the dry gas can be sourced from an external source.

In one embodiment, the dry gas can be nitrogen. In one embodiment, the nitrogen can originate from external sources such as from a nearby pipeline or can be a pressurized nitrogen stream coming from the cold box (either directly from the cold box or after a compressor if it is at a lower pressure (e.g., waste nitrogen stream or low pressure nitrogen product). In another embodiment, the dry gas can be purified air. In one embodiment, the purified air can originate from a high pressure air buffer tank.

In one embodiment in which nitrogen is used as the dry gas, it is preferable to extend the time for the vessel changeover step (e.g., both first adsorber A and second adsorber B receive wet air 2 and operate in a parallel adsorption cycle) in order to mitigate any process upset on the air separation unit (ASU) due to the change in gas composition during this changeover. In one embodiment, this is accomplished by use of small nitrogen blending valves. In another embodiment, an automatic increase in column liquid nitrogen reflux flow and liquid nitrogen withdraw can be implemented to further minimize this disturbance.

In one embodiment, a method for the production of air gases by the cryogenic separation of air with front end purification and air compression can include the steps of:

a) compressing atmospheric air to a pressure suitable for the cryogenic rectification of air to produce a compressed wet air stream;

b) purifying a compressed wet air stream of water and carbon dioxide within a front end purification system to produce a dry air stream having reduced amounts of water and carbon dioxide as compared to the compressed wet air stream, wherein the front end purification system comprises a first vessel and a second vessel configured in a permutable fashion, wherein the first vessel comprises a first adsorber and the second vessel comprises a second adsorber, wherein the first and second adsorbers operate in alternating cycles such that while the first adsorber is in an adsorption cycle, the second adsorber is in a regeneration cycle and while the second adsorber is in the adsorption cycle, the first adsorber is in the regeneration cycle;

c) introducing the dry air stream to a cold box under conditions effective to separate air into a nitrogen enriched stream and an oxygen enriched stream; and d) withdrawing the nitrogen enriched stream and the oxygen enriched stream from the cold box.

In one embodiment, the regeneration cycle for each vessel of the front end purification system can further includes the steps of: 1) depressurizing the vessel from an adsorption pressure to a regeneration pressure that is sufficiently low to release water and carbon dioxide from a surface of an adsorbent material within the vessel; 2) regenerating the adsorbent material using a first dry gas; and 3) pressurizing the vessel to the adsorption pressure using a second gas. In one embodiment, the second gas used in step 3) of the regeneration cycle is a second dry gas not sourced directly from the vessel that is in the adsorption cycle. In one embodiment, the flow rate of the dry air stream introduced to the cold box remains substantially constant during step c) regardless of adsorption cycle.

In optional embodiments of the method for the production of air gases by the cryogenic separation of air with front end purification and air compression:

step 2) of the regeneration cycle for each vessel of the front end purification system can further include the steps of 2a) heating the adsorbent material to a regeneration temperature $T_R$ by heating the dry gas upstream the vessel for a first period of time and then 2b) cooling the adsorbent material to a second temperature $T_2$ by continuing to introduce the dry gas into the vessel, but without adding heat to the dry gas upstream of the vessel;

the flow rate of the compressed wet air stream sent to the front end purification system remains substantially constant during steps b) and 3);

the method includes an absence of the steps of: increasing the flow rate of the compressed wet air stream sent to the front end purification system; and decreasing the flow rate of the dry air stream introduced to the cold box (e.g., the flow rate of compressed air from the MAC stays relatively constant throughout the entire cycle while also keeping the flow of dry air to the cold box relatively constant throughout the entire cycle as well);

step 3) of the regeneration cycle includes an absence of sending a portion of the dry air stream from the first vessel to the second vessel when the second vessel is pressurizing;

the first dry gas comprises the nitrogen enriched stream from the cold box;

the second dry gas comprises the nitrogen enriched stream from the cold box;

the second dry gas comprises a dry gas stream from an external source;

the second dry gas is a synthetic air stream having a composition similar to that of air, wherein the synthetic air stream consists essentially of oxygen and nitrogen sourced from the cold box;

the second dry gas comprises nitrogen and oxygen, wherein the nitrogen content is between 70 and 88% and the oxygen content is between 12 and 30%;

the second dry gas is sourced from a compressed air storage tank, wherein the compressed air storage tank is in fluid communication with the front end purification system, such that the compressed air storage tank is configured to receive a portion of the dry air stream exiting the front end purification system prior to the dry air stream being introduced to the cold box;

the method further comprises a switch over step following step 3) of the regeneration cycle in which both the first adsorber and the second adsorber are adsorbing in a parallel fashion;

during the course of the switch over step, flow of the compressed wet air stream is gradually increased to the adsorber that just finished its pressurizing step;

the rate of increasing the flow of the compressed wet air stream to the adsorber that just finished its pressurizing step is adjusted based on the composition of the dry gas sent to the cold box or the composition of the dry gas exiting one or more of the vessels or the composition of gas being used to pressurize the vessel;

the method further includes a step of monitoring the composition of the purified gas at a location selected from within the front end purification system or between the front end purification system and the cold box.

In another aspect of the invention, an apparatus for the production of air gases by the cryogenic separation of air with front end purification and air compression is provided. In one embodiment, the apparatus may include: a main air compressor configured to compress atmospheric air to a pressure suitable for the cryogenic rectification of air to produce a compressed wet air stream; a front end purification system in fluid communication with the main air compressor, such that the front end purification system is configured to receive the compressed wet air stream from the main air compressor and purify the compressed wet air stream of water and carbon dioxide to produce a dry air stream having reduced amounts of water and carbon dioxide as compared to the compressed wet air stream, wherein the front end purification system comprises a first vessel and a second vessel configured in a permutable fashion, wherein the first vessel comprises a first adsorber and the second vessel comprises a second adsorber, wherein the first and second adsorbers operate in alternating cycles such that while the first adsorber is in an adsorption cycle, the second adsorber is in a regeneration cycle and while the second adsorber is in the adsorption cycle, the first adsorber is in the regeneration cycle; and a cold box in fluid communication with the front end purification system, such that the cold box is configured to receive the dry air stream from the front end purification system and separate the dry air stream into a nitrogen enriched stream and an oxygen enriched stream.

In one embodiment, the regeneration cycle of each vessel of the front end purification system is configured to:

1) depressurize the vessel from an adsorption pressure to a regeneration pressure that is sufficiently low to release water and carbon dioxide from a surface of an adsorbent material within the vessel;

2) regenerate the adsorbent material using a first dry gas; and 3) pressurize the vessel to the adsorption pressure using a second dry gas.

In one embodiment, the apparatus has an absence of a flow means configured to transfer a portion of the dry air stream from the first adsorber directly to the second adsorber when the second adsorber is in its pressurization cycle.

In another embodiment, the main air compressor is configured to operate at substantially the same flow rate during all cycles of the front end purification system, and wherein the cold box is configured to operate at substantially the same flow rate of the dry air stream dry air during all cycles of the front end purification system.

In another embodiment, the apparatus may also include a compressed air storage tank configured to source the second dry gas, wherein the compressed air storage tank is in fluid communication with the front end purification system, such that the compressed air storage tank is configured to receive a portion of the dry air stream exiting the front end purification system prior to the dry air stream being introduced to the cold box. In one embodiment, the compressed air storage tank is configured to receive a continuous flow of the portion of the dry air stream. In one embodiment, the compressed air storage tank is configured to provide the second dry gas to the front end purification system during repressurization intermittently. In one embodiment, the flow rate of the portion of the dry air stream sent to the air storage tank is less than 1% of the total flow of air from the MAC.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

Figure 1:
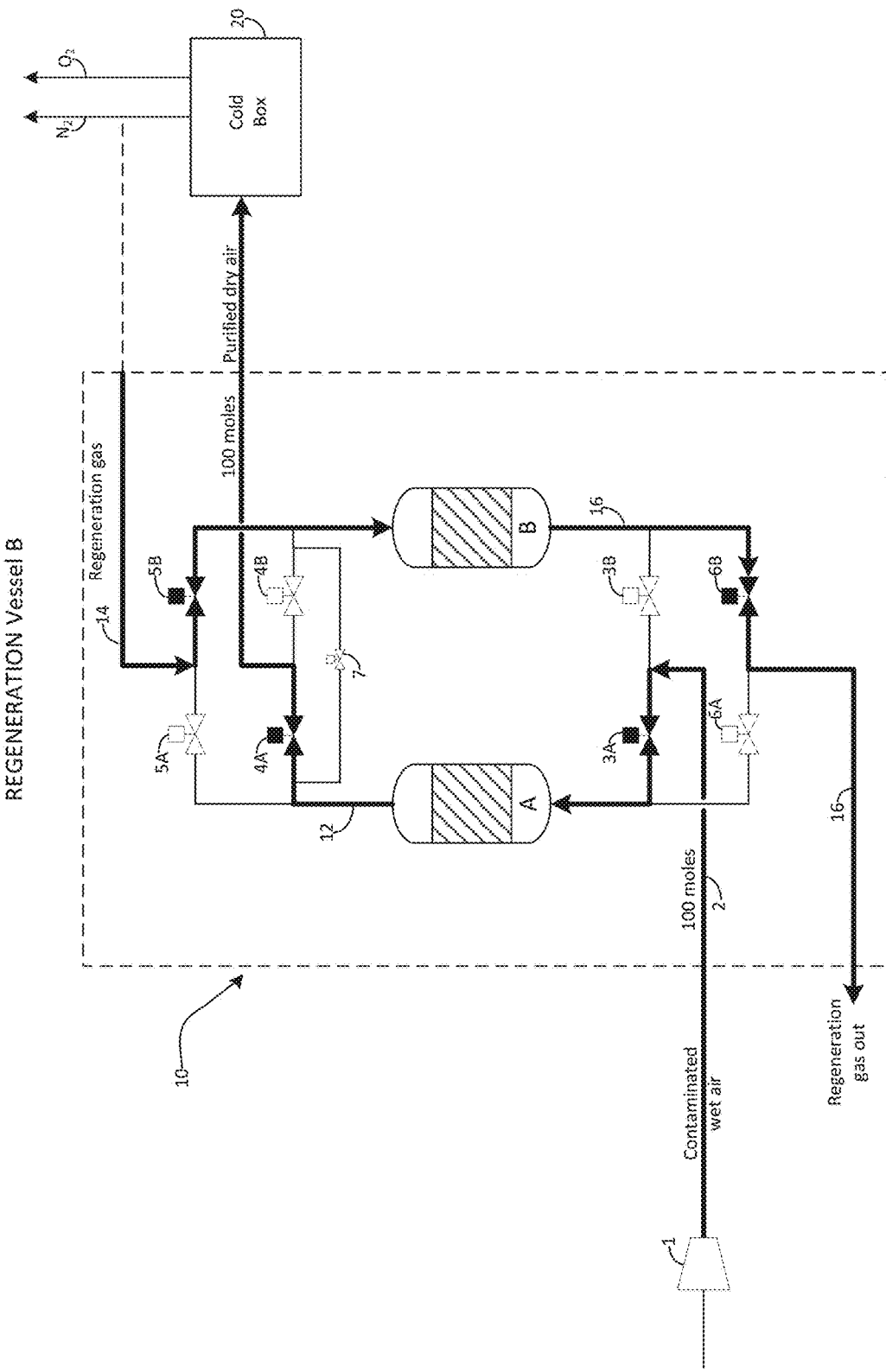
FIG. 1 provides an embodiment of the prior art in which vessel A is adsorbing and vessel B is being regenerated.
Figure 3:
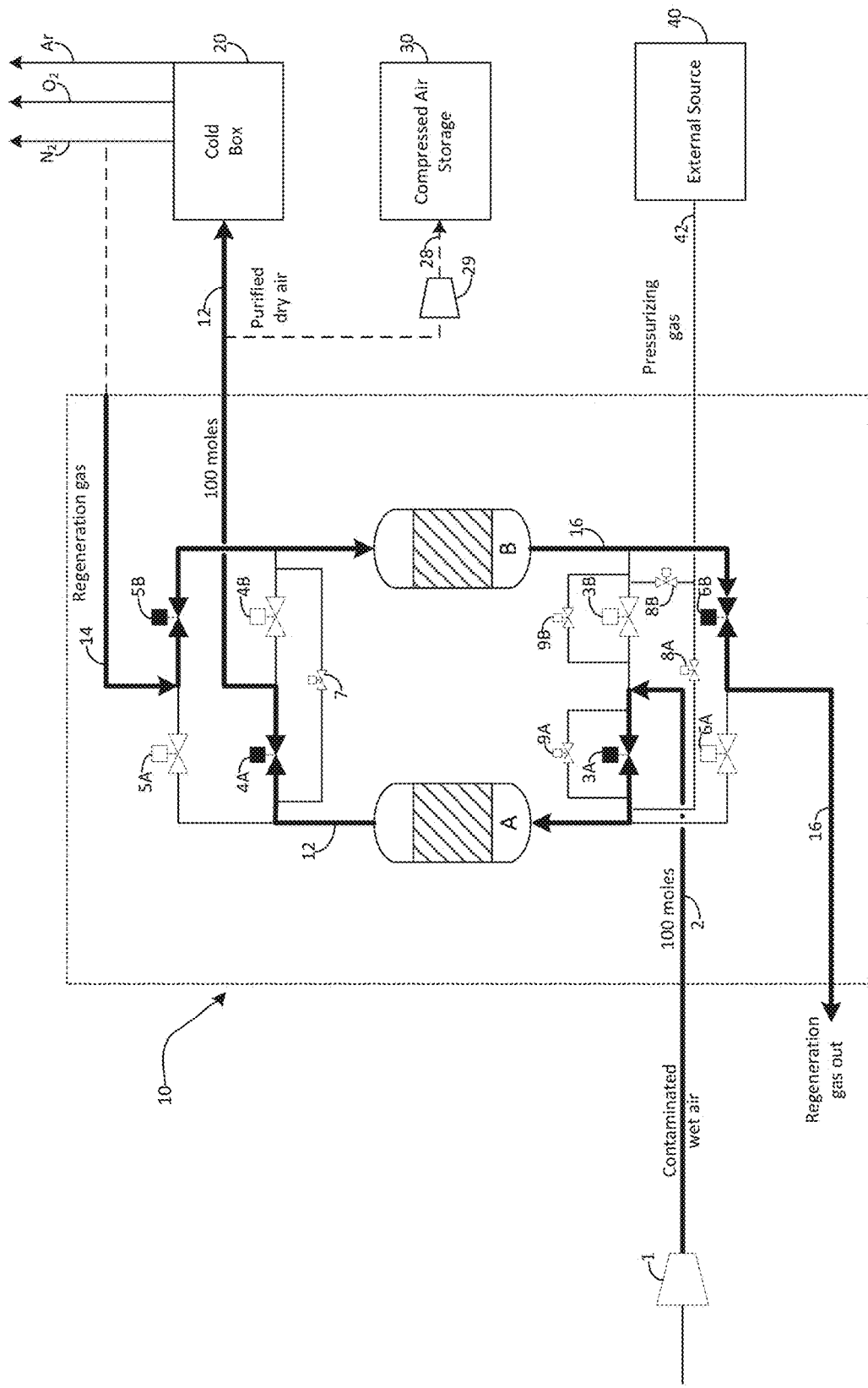
FIG. 3 provides an embodiment of the present invention in which vessel A is adsorbing and vessel B is being regenerated.
Figure 4:
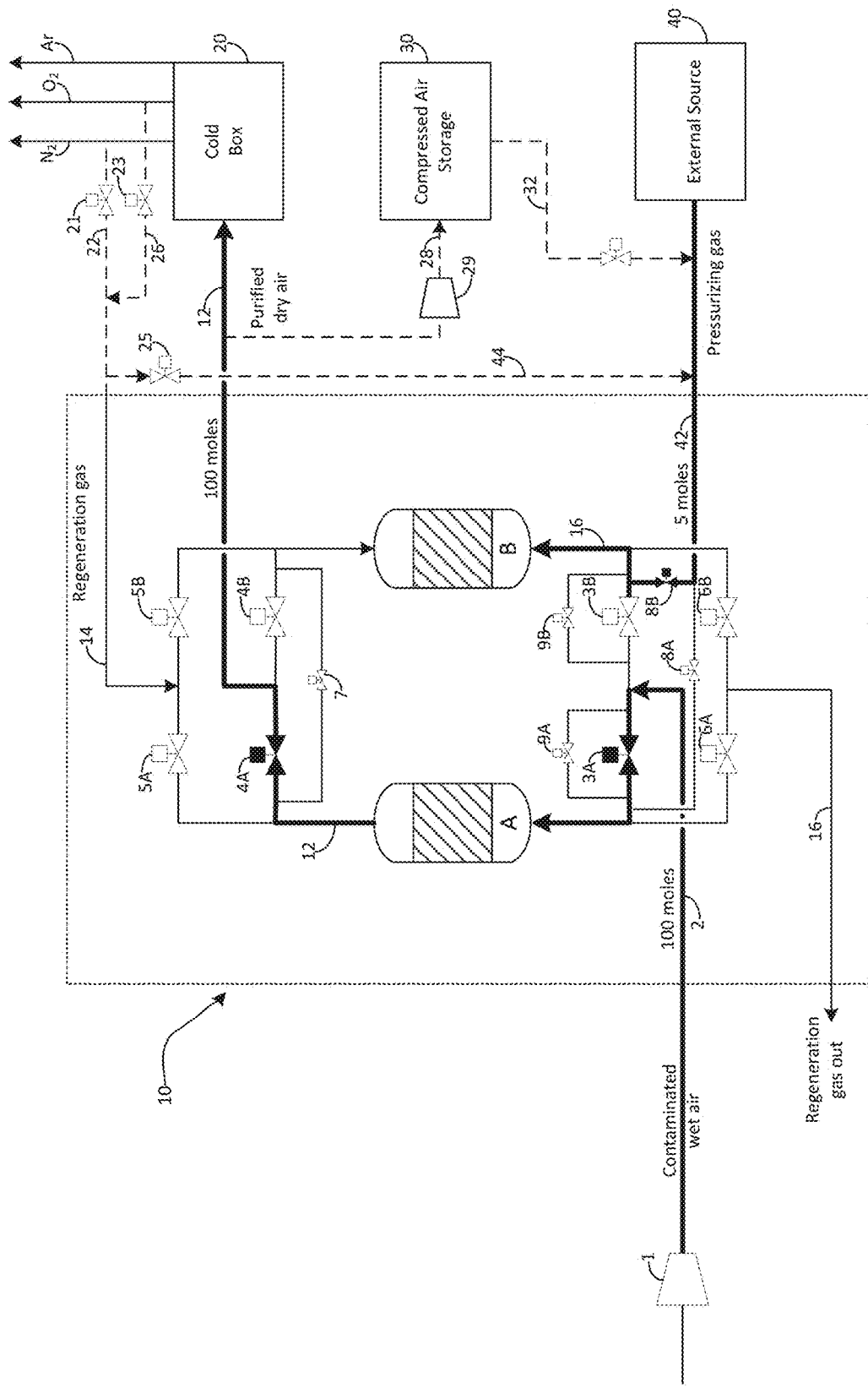
FIG. 4 provides an embodiment of the present invention in which vessel A is adsorbing and vessel B is being pressurized.

FIGS. 3 and 4 represent embodiments of the present invention. As in FIG. 1, FIG. 3 represents a flow diagram of front end purification unit 10, in which first adsorber A is in its adsorption cycle and second adsorber B is in the cleaning stage of its regeneration cycle. In this setup, valves 3A, 4A, 5B and 6B are open, while valves 3B, 4B, 5A, 6A, 7, 8A, 8B, 9A, and 9B are closed. As shown in FIG. 3, the flow of gases (air and regeneration gas) during adsorption and cleaning stage of regeneration are largely unchanged. The primary difference between the setups of FIG. 1 and FIG. 3 is the presence of pressurizing gas line 42 and valves 8A and 8B.

Bypass valves 9A and 9B are also included, but they are optional, as will be explained in more detail. In a preferred embodiment, pressurizing gas line 42 contains a dry pressurizing gas. However, a wet pressurizing gas can also be used.

Another optional element is purified air slip stream 28 and compressed air storage 30. In this optional embodiment, a small portion of purified air can be compressed 29 sent to the compressed air storage 30, such that the process can have a storage tank of air, which can be useful for various purposes. In embodiments including compressed air storage 30, not all of the air compressed by the MAC and purified by the adsorbers will be sent to the cold box 20. In one embodiment, purified air slip stream 28 can be a continuous flow, preferably at a constant flow rate. In one embodiment, the percentage flow of purified air slip stream 28 as compared to the flow rate of compressed wet air 2 can be based on the amount of dry gas used during the repressurization vis-à-vis the total adsorber cycle (i.e., adsorption, depressurization, regeneration), and therefore, can be of the order of less than 2% of the flow rate of compressed wet air 2, preferably less than 1%, preferably less than 0.5%, more preferably about 0.05-0.5%.

Figure 2:
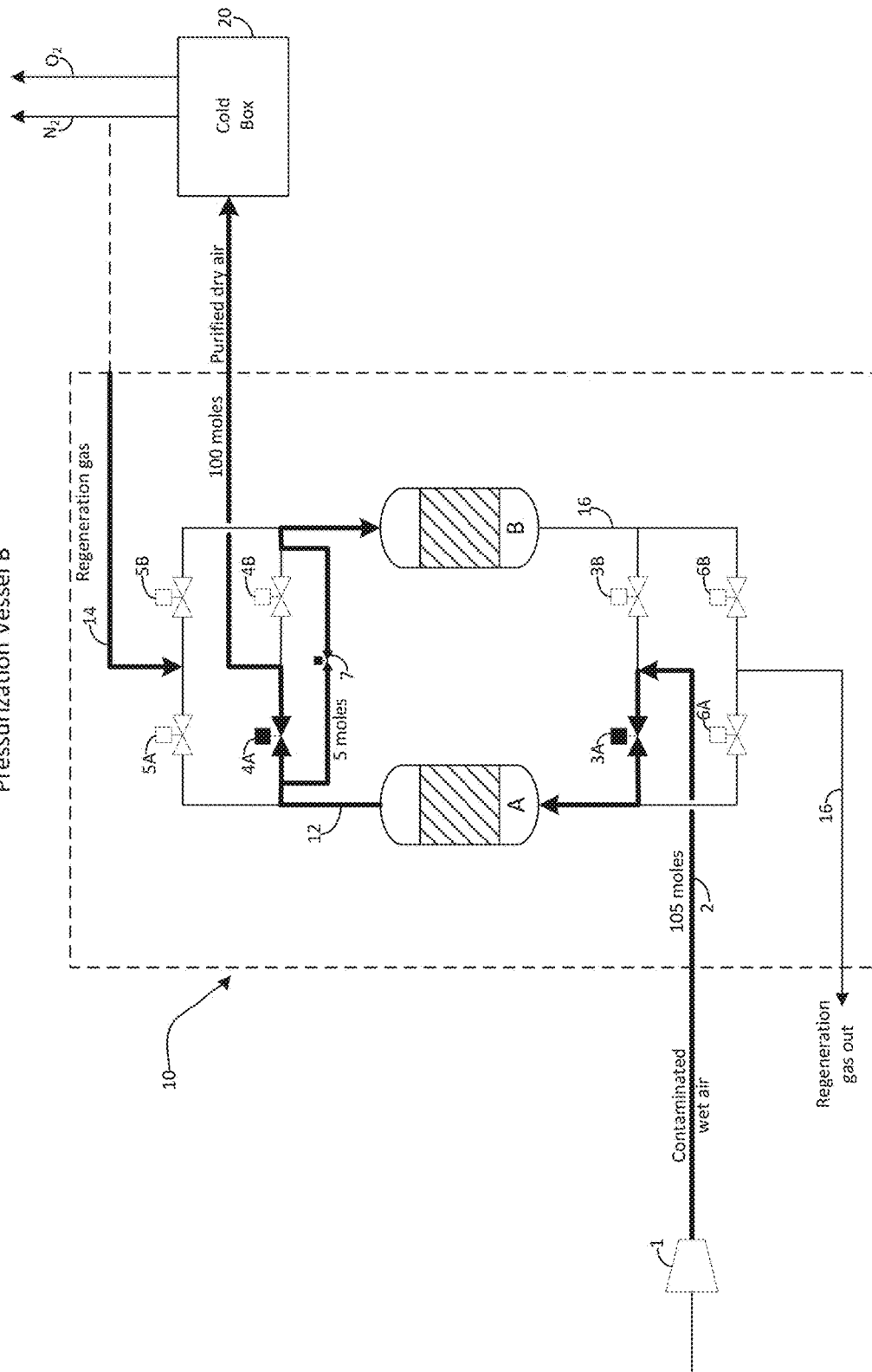
FIG. 2 provides an embodiment of the prior art in which vessel A is adsorbing and vessel B is being pressurized.

Similarly to FIG. 2, FIG. 4 represents a flow diagram of front end purification unit 10 in which first adsorber A is still in an adsorption cycle and second adsorber B is in a repressurization phase (pressurizing back to normal adsorption pressure (e.g., high pressure) to get ready for its adsorption phase). However, instead of using purified air coming from first adsorber A to pressurize second adsorber B by opening valve 7, second adsorber B can be pressurized by introducing a dry, pressurized gas from an external source 40. It is preferable that the gas from the external source 40 is dry; however, in certain embodiments the pressurized gas can be wet.

In the embodiment shown, 5 moles of pressurizing gas via line 42 pass through valve 8B and into second adsorber B. This allows the flow rate coming from the MAC to remain unchanged (100 moles in this example) while also keeping the flow rate of purified, dry gas 12 sent to the cold box 20 to also remain constant.

In one embodiment, valves 3A, 3B, 4A, 4B, 5A, 5B, 6A, and 6B, are on/off valves, meaning that they are configured to either be opened or closed, and do not partially open. Valves 7, 8A, 8B, 9A, and 9B are preferably configured to control the flow rates through their respective lines and can be set to any point between closed and fully open.

In one embodiment, the dry, pressurizing gas 42 can be a pressurized nitrogen rich product stream from the cold box. In another embodiment, the pressurizing gas 42 can come from the same source as the regeneration gas 14, such as a waste nitrogen stream coming from the cold box (e.g., stream 44 by passing through valves 21 and 25 and then pressurized to an appropriate pressure via a pressurizing means not shown). Other sources for pressurizing gas 42 can include nearby pipelines (e.g., a pressurized nitrogen pipeline), pressurized gas vaporized from a liquid storage tank (e.g., nitrogen and/or oxygen storage tank). In yet another embodiment, the pressurizing gas 42 can be introduced to the top of the adsorbers A, B by reversing flow through line 44 and going through valves 5A, 5B as appropriate.

In an alternate embodiment, pressurizing gas 42 can be a synthetic air stream made of nitrogen 22 (e.g., product and/or waste nitrogen) and oxygen 26 coming from the cold box 20 in respective amounts that simulate the composition of air. Valves 21 and 23 can be configured to control the flow rates of the two gases appropriately. This preferably allows the pressurization gas to have the same composition as that of air without using any of the purified air coming out of the adsorber vessels A or B. Alternatively, in embodiments with compressed air storage 30, compressed air 32 can be used as the pressurizing gas 42.

In one embodiment, front end purification unit can include bypass valves 9A and 9B. In embodiments in which the pressurizing gas 42 has a composition different from air, the process can include a switch cycle in which both first adsorber A and second adsorber B receive wet air 2 and operate in a parallel adsorption cycle. This allows for the composition within second adsorber B to slowly equilibrate to that of air while also maintaining the composition of the dry air stream sent to the cold box, thereby reducing any potential process upsets associated with sending a significantly different composition to the cold box.

Figure 5:
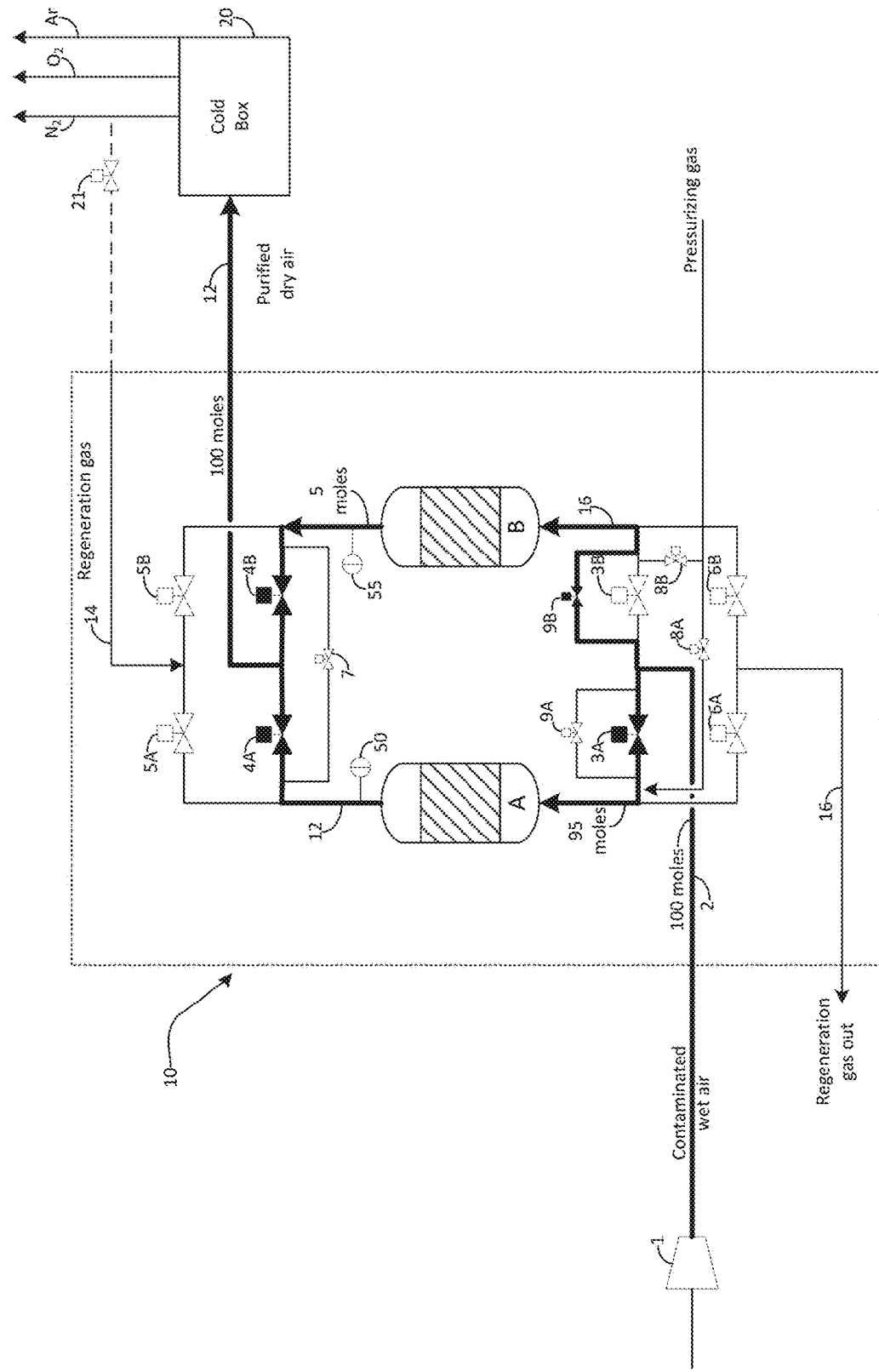
FIG. 5 provides an embodiment of the present invention in which both vessels are adsorbing.

As shown in FIG. 5, valves 3A, 4A, 4B and 9B are set to open, while valves 3B, 5A, 5B, 6A, 6B, 7, 8A, 8B, 7, 9A are set to closed. In one embodiment, valve 9B is only slightly open and then gradually opens more and more until the composition within second adsorber B is that of air. In one embodiment, the process can include a step of measuring the composition of the purified gas exiting one or both of the adsorbers, and once they match or are within the tolerance range (e.g., approximately 78% nitrogen), valve 3B can be set to fully open before closing valve 9B, while also closing valves 3A and 4A, thereby placing second adsorber B in the adsorption cycle. In another embodiment, the opening and closing of valves 3A, 3B, 4A and 9B can be set to a predetermined time delay. In one embodiment, this time delay can be based on the time needed to allow adsorber B to approach a composition similar to that of air. Following the switchover, an appropriate depressurizing valve (not shown) would be opened to despressurize adsorber A to essentially atmospheric pressure and then valves 5A and 6A would be opened and the depressurizing valve (not shown) would be closed in order to start the regeneration cycle of first adsorber A.

Alternatively at the beginning of the parallel run, valve 3A can be closed while valve 9A can be set to fully open. Valve 9A can then subsequently be adjusted in step with the gradual adjustment of valve 9B in order to provide additional fine tuning.

In one embodiment, gas analyzers 50, 55 can be in electric communication with a controller (not shown) that is configured to adjust the biases of valves, for example valves 3A, 3B, 9A and 9B, based on the composition of the purified dry gas exiting the first and second adsorbers. Those of ordinary skill in the art will also recognize that flow indicators could be included in order to follow the flow rates of various streams. However, these flow indicators have been left off in order to provide more clarity for the figures.

For illustrative purposes, in one embodiment, the adsorption pressure can be at least 4 bar, preferably between 5-6 bar. Regeneration pressure is preferably just above atmospheric pressure; however, those of ordinary skill in the art will recognize that the pressure can be anything lower than the adsorption pressure that is still effective for removing the adsorbed impurities. In another embodiment, adsorption temperature can be around 55° F.±15° F., while the heating cycle of the regeneration phase can be approximately 300° F. Again, those of ordinary skill in the art will recognize that the temperature can be adjusted in order to improve adsorption or regeneration conditions. In a preferred embodiment, the adsorption cycle can last between 1.5 to 4 hours, with the regeneration cycle also being between 1.5 to 4 hours. In a preferred embodiment, the regeneration cycle can include a depressurization step lasting less than 10 minutes, a heating and subsequent cooling step, a pressurization step of about 10 minutes, and then a switching step of about 10 minutes. In one embodiment, the heating step can last about 36 to 84 minutes and the cooling step can last about 54 to 126 minutes. In a preferred embodiment, the cooling step is approximately 50% longer than the heating step.

Figure 6:
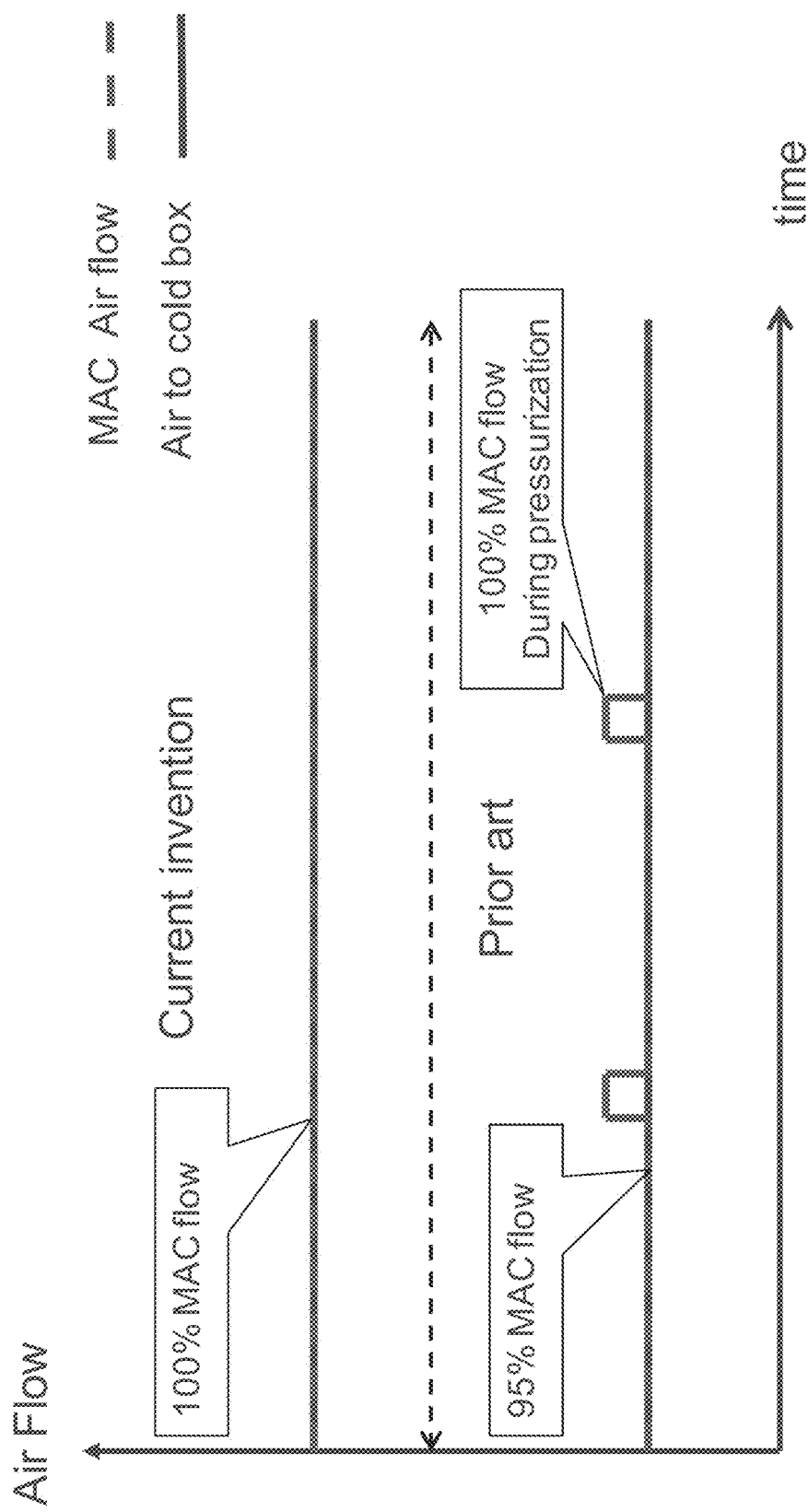
FIG. 6 provides a graphical comparison between embodiments of the current invention and that of the prior art.

FIG. 6 provides a comparison view of the theoretical advantage of embodiments of the present invention as compared to the methods of the prior art. The top line shows that embodiments of the current invention can flow at approximately 100% of the available MAC flow continuously. The bottom portion of the graph shows that the methods of the prior art have to run at approximately 95% of the available MAC capacity and have periods of 100% available MAC flow only during the pressurization phase.

WORKING EXAMPLES

Figure 7:
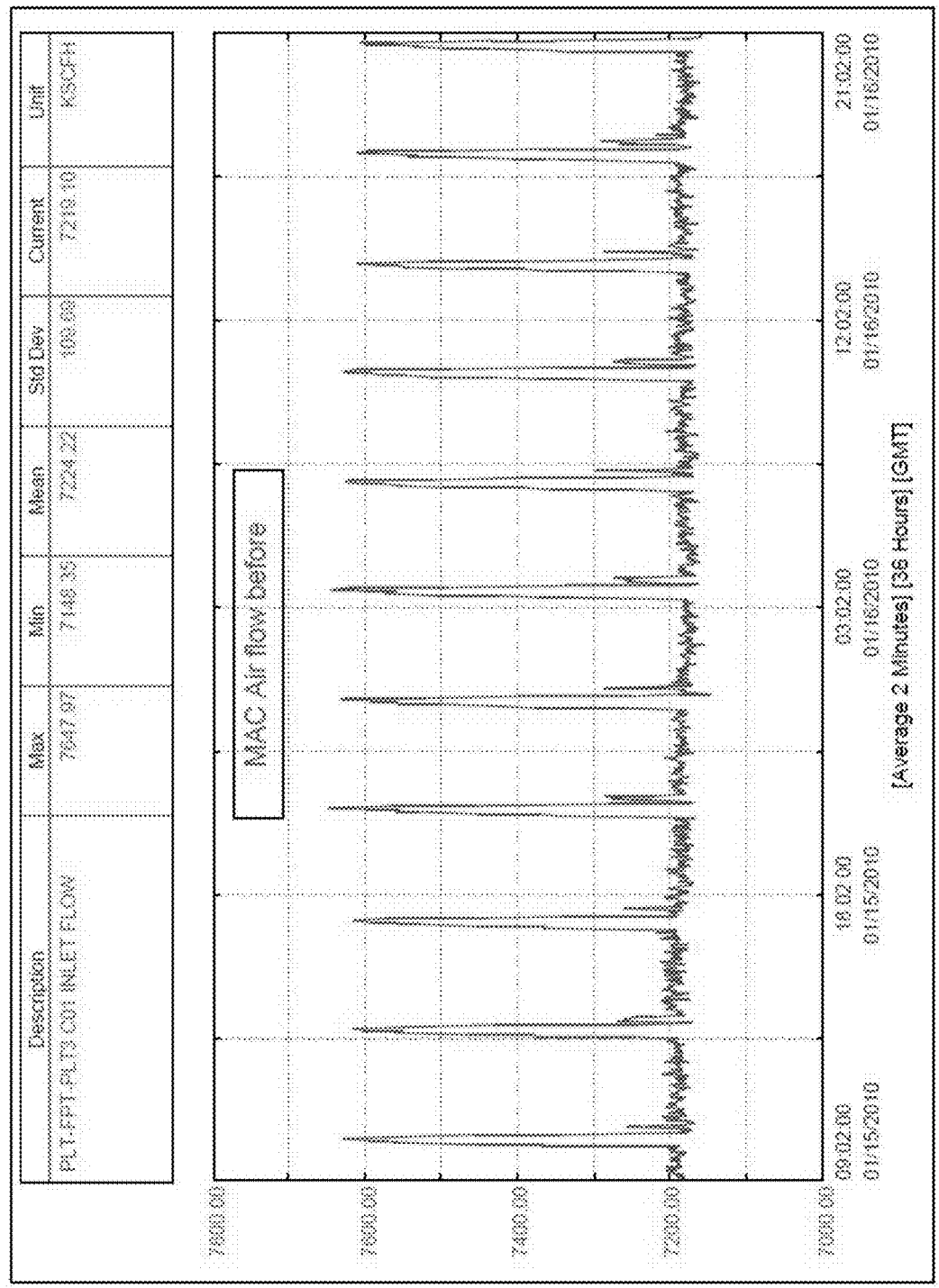
FIG. 7 provides a graphical representation of the main air compressor flow rate for an embodiment of the prior art.
Figure 8:
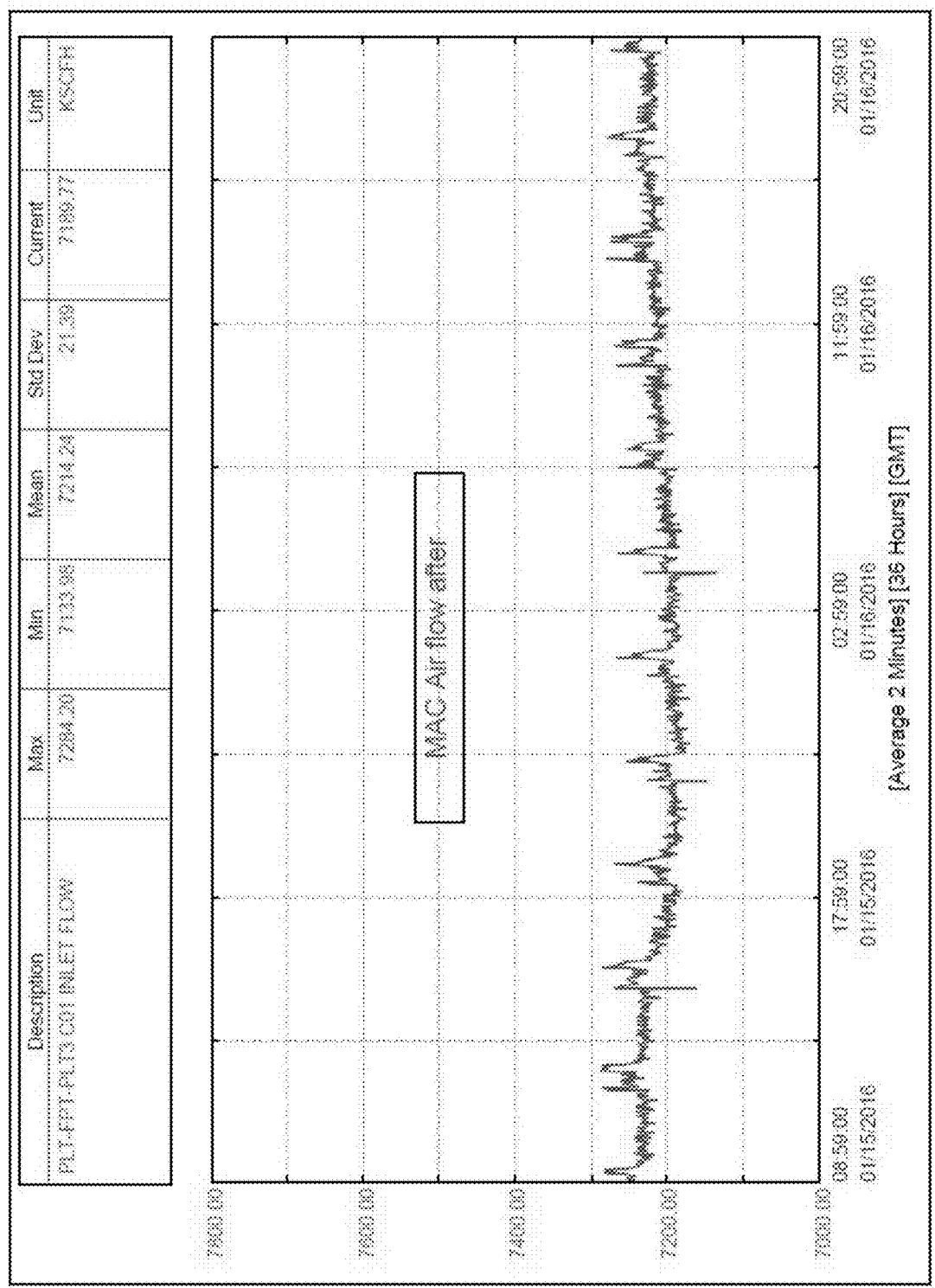
FIG. 8 provides a graphical representation of the main air compressor flow rate for an embodiment of the present invention.

FIGS. 7-10 provide actual data for setups of the prior art as compared to an embodiment of the present invention. FIG. 7 provides a graphical representation of MAC air flow rate versus time for methods of the prior art. As can be seen, during periods of pressurization, the MAC air flow rate drastically rises and falls during this period. FIG. 8 provides the same graphical representation of MAC air flow rate as a function of time for an embodiment of the present invention. As can be clearly seen, the MAC air flow rate is much smoother and does not have drastic spikes. Not only does this allow the MAC to be sized in a more efficient manner, it can also help to extend the life of the MAC as it is not experiencing drastic fluctuations throughout its lifecycle.

Figure 9:
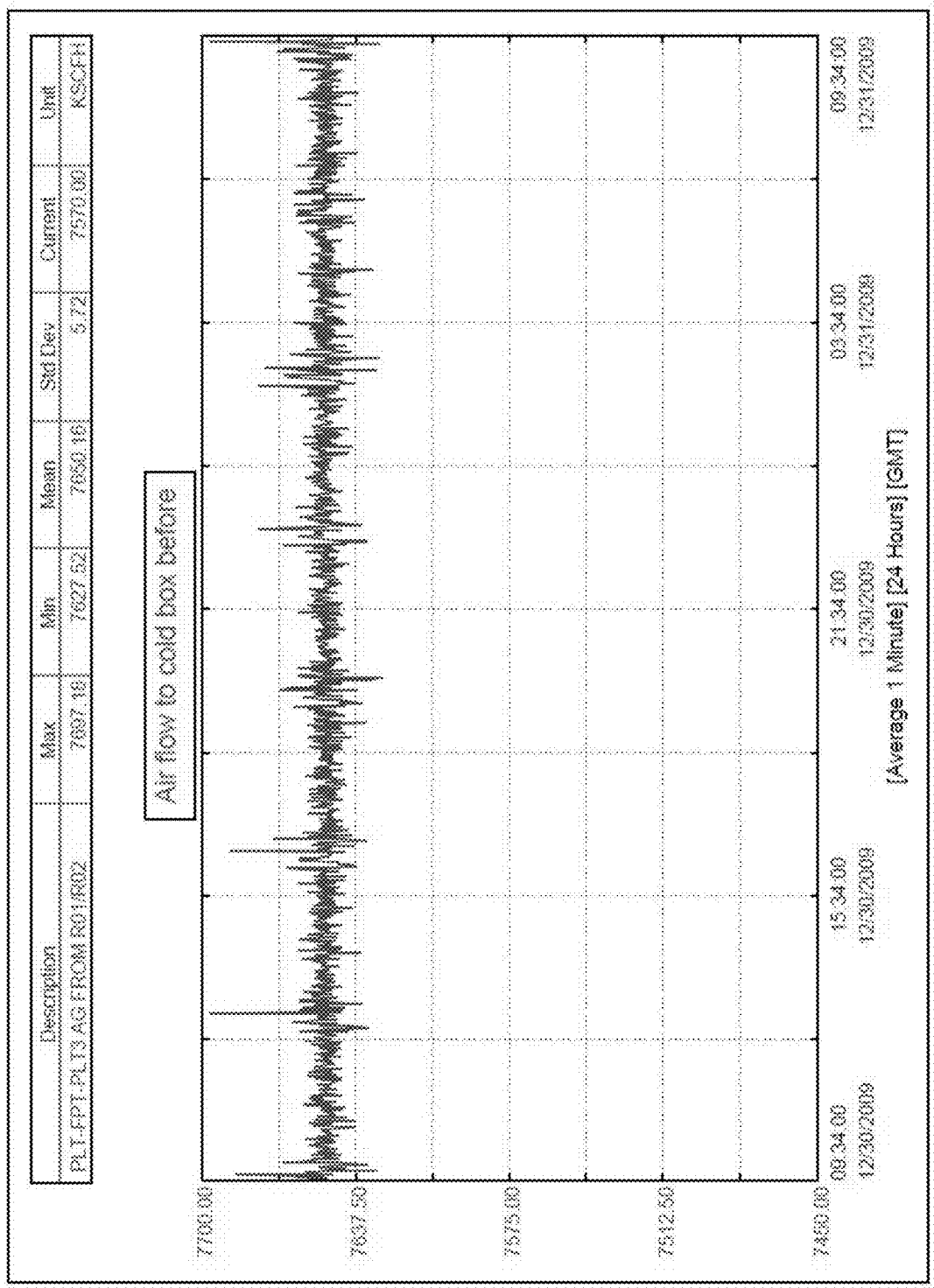
FIG. 9 provides a graphical representation of the flow rate of dry air sent to the cold box for an embodiment of the prior art.
Figure 10:
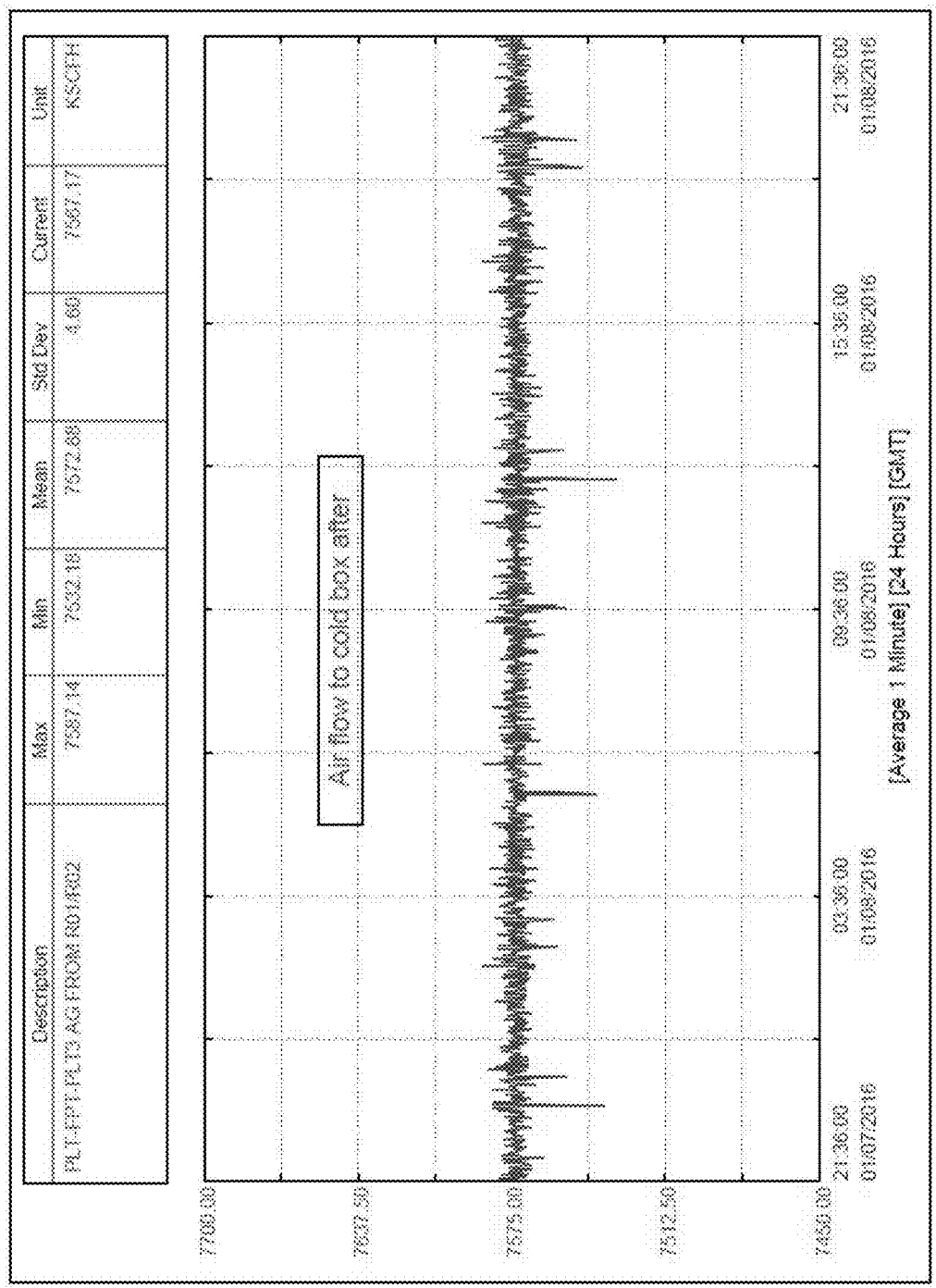
FIG. 10 provides a graphical representation of the flow rate of dry air sent to the cold box for an embodiment of the present invention.

FIGS. 9 and 10 provide graphical representations of the air flow sent from the front end purification system to the cold box for the methods of the prior art and methods in accordance with an embodiment of the present invention, respectively. While not as pronounced as the MAC air flow rate, embodiments of the present invention advantageously provide a smaller standard deviation to the cold box (5.72 vs. 4.60). This can be attributed to less disruptions during the process caused by the spiking of the MAC.

The terms "nitrogen-rich" and "oxygen-rich" will be understood by those skilled in the art to be in reference to the composition of air. As such, nitrogen-rich encompasses a fluid having a nitrogen content greater than that of air. Similarly, oxygen-rich encompasses a fluid having an oxygen content greater than that of air. The term "dry" as it pertains to gases will be understood by those skilled in the art to encompass a gas that has reduced amounts of water vapor as compared to the contaminated wet air (i.e., local atmospheric air).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

We claim:

1. A method for the production of air gases by the cryogenic separation of air with front end purification and air compression, the method comprising the steps of:
   a) compressing atmospheric air to a pressure suitable for the cryogenic rectification of air to produce a compressed wet air stream;
   b) purifying the compressed wet air stream of water and carbon dioxide within a front end purification system to produce a dry air stream having reduced amounts of water and carbon dioxide as compared to the compressed wet air stream, wherein the front end purification system comprises a first vessel and a second vessel configured in a permutable fashion, wherein the first vessel comprises a first adsorber and the second vessel comprises a second adsorber, wherein the first and second adsorbers operate in alternating cycles such that while the first adsorber is in an adsorption cycle, the second adsorber is in a regeneration cycle and while the second adsorber is in the adsorption cycle, the first adsorber is in the regeneration cycle;
   c) introducing the dry air stream to a cold box under conditions effective to separate the dry air stream into a nitrogen enriched stream and an oxygen enriched stream; and
   d) withdrawing the nitrogen enriched stream and the oxygen enriched stream from the cold box;
   wherein the regeneration cycle for each of the first and the second vessels of the front end purification system further includes the steps of:
   1) depressurizing the first or second vessel from an adsorption pressure to a regeneration pressure that is sufficiently low to release water and carbon dioxide from a surface of an adsorbent material within the vessel;
   2) regenerating the adsorbent material using a first dry gas; and
   3) pressurizing the first or second vessel to the adsorption pressure using a second gas,
   wherein the second gas used in step 3) of the regeneration cycle is not sourced directly from the first or second vessel that is in the adsorption cycle,
   wherein the flow rate of the dry air stream introduced to the cold box remains substantially constant during step c).

2. The method as claimed in claim 1, wherein step 2) of the regeneration cycle for each vessel of the front end purification system further includes the steps of 2a) heating the adsorbent material to a regeneration temperature $T_R$ by heating the dry gas upstream the vessel for a first period of time and then 2b) cooling the adsorbent material to a second temperature $T_2$ by continuing to introduce the dry gas into the vessel, but without adding heat to the dry gas upstream of the vessel.

3. The method as claimed in claim 1, wherein the flow rate of the compressed wet air stream sent to the front end purification system remains substantially constant during steps b) and 3).

4. The method as claimed in claim 1, wherein during the step of pressurizing the vessel, the method comprises an absence of the steps of:
   increasing the flow rate of the compressed wet air stream sent to the front end purification system; and
   decreasing the flow rate of the dry air stream introduced to the cold box.

5. The method as claimed in claim 1, wherein the step 3) of the regeneration cycle comprises an absence of sending a portion of the dry air stream from the first vessel to the second vessel when the second vessel is pressurizing.

6. The method as claimed in claim 1, wherein the first dry gas comprises the nitrogen enriched stream from the cold box.

7. The method as claimed in claim 1, wherein the second gas is a second dry gas.

8. The method as claimed in claim 7, wherein the second dry gas comprises the nitrogen enriched stream from the cold box.

9. The method as claimed in claim 7, wherein the second dry gas comprises a dry gas stream from an external source.

10. The method as claimed in claim 7, wherein the second dry gas is a synthetic airstream consisting essentially of oxygen and nitrogen sourced from the cold box.

11. The method as claimed in claim 7, wherein the second dry gas comprises nitrogen and oxygen, wherein the nitrogen content is between 70 and 88% and the oxygen content is between 12 and 30%.

12. The method as claimed in claim 7, wherein the second dry gas is sourced from a compressed air storage tank, wherein the compressed air storage tank is in fluid communication with the front end purification system, such that the compressed air storage tank is configured to receive a portion of the dry air stream exiting the front end purification system prior to the dry air stream being introduced to the cold box.

13. The method as claimed in claim 1, wherein the method further comprises a switch over step following step 3) of the regeneration cycle in which both the first adsorber and the second adsorber are adsorbing in a parallel fashion.

14. The method as claimed in claim 13, wherein during the course of the switch over step, flow of the compressed wet air stream is gradually increased to the first or second adsorber that just finished pressurizing.

15. The method as claimed in claim 14, wherein the rate of increasing the flow of the compressed wet air stream to the first or second adsorber that just finished pressurizing is adjusted based on the composition of the dry gas sent to the cold box or the composition of the dry gas exiting the first vessel and/or the second vessel or the composition of the second gas.

16. The method as claimed in claim 1, further comprising the step of monitoring the composition of the purified gas at a location selected from within the front end purification system or between the front end purification system and the cold box.

17. A method for the production of air gases by the cryogenic separation of air, the method comprising the steps of:

compressing atmospheric air in a main air compressor to a pressure suitable for the cryogenic rectification of air to produce a compressed wet air stream;

purifying the compressed wet air stream of water and carbon dioxide within a front end purification system to produce a dry air stream having reduced amounts of water and carbon dioxide as compared to the compressed wet air stream;

introducing the dry air stream to a cold box under conditions effective to separate the dry air stream into a nitrogen enriched stream and an oxygen enriched stream; and withdrawing the nitrogen enriched stream and the oxygen enriched stream from the cold box;

wherein the front end purification system comprises a first vessel and a second vessel configured in a permutable fashion such that while the first vessel is in an adsorption cycle, the second vessel is in a regeneration cycle, wherein during the adsorption cycle of the first vessel, the first vessel receives the compressed wet air stream and produces the dry air stream;

wherein during the regeneration cycle, the second vessel is:
  (a) depressurized from an adsorption pressure to a regeneration pressure that is sufficiently low to release water and carbon dioxide from a surface of an adsorbent material within the second vessel;
  (b) regenerated by flowing a first dry gas across the adsorbent material of the second vessel to remove released water and carbon dioxide; and
  (c) repressurized to the adsorption pressure using a second gas, wherein the second vessel is repressurized during step (c) without:
  (1) diverting any of the dry air stream exiting the first vessel to the second vessel,
  (2) changing the flow rate of atmospheric air being compressed in the main air compressor, or
  (3) changing the flow rate of the dry air stream sent to the cold box.

* * * * *